United States Patent [19]

Porter

[11] 4,372,924
[45] Feb. 8, 1983

[54] PURIFICATION OF ALKALI METAL HYDROXIDES

[75] Inventor: David L. Porter, Baton Rouge, La.

[73] Assignee: The Dow Chemical Company, Midland, Mich.

[21] Appl. No.: 153,351

[22] Filed: May 27, 1980

[51] Int. Cl.³ .............................................. C01D 1/04
[52] U.S. Cl. ................................... 423/179; 423/643
[58] Field of Search ................ 423/181, 183, 643, 179

[56] References Cited

U.S. PATENT DOCUMENTS

| 2,196,594 | 4/1940 | Muskat ................................. 423/643 |
| 2,196,595 | 4/1940 | Muskat ................................. 423/181 |
| 2,285,299 | 6/1942 | Muskat et al. . |
| 2,285,300 | 6/1942 | Muskat . |
| 2,325,339 | 7/1943 | Muskat . |
| 2,349,596 | 5/1944 | Muskat . |
| 2,354,823 | 8/1944 | Muskat et al. . |
| 2,373,257 | 4/1945 | Muskat . |
| 2,622,009 | 12/1952 | Neubauer et al. . |
| 2,894,732 | 7/1959 | Taber et al. ......................... 422/257 |
| 3,917,811 | 11/1975 | Grout et al. ......................... 423/659 |

Primary Examiner—O. R. Vertiz
Assistant Examiner—Wayne A. Langel
Attorney, Agent, or Firm—R. W. Selby

[57] ABSTRACT

A method to purify an aqueous solution of an alkali metal hydroxide by countercurrently contacting the ammonia and hydroxide, in a volume ratio of about 0.6 to 1 to about 1 to 1, in a packed bed. The temperature in the lower portion of an extractor in which the process is carried out is controlled and maintained within a range of at least about 155° to about 170° F.

17 Claims, 2 Drawing Figures

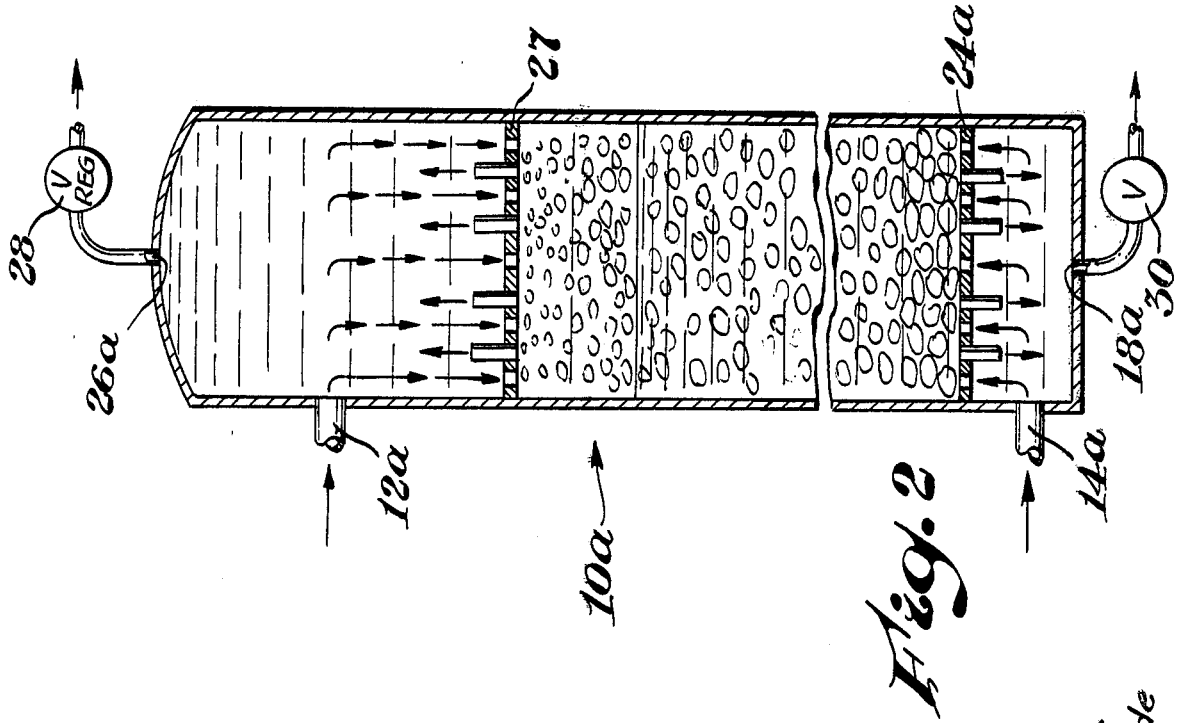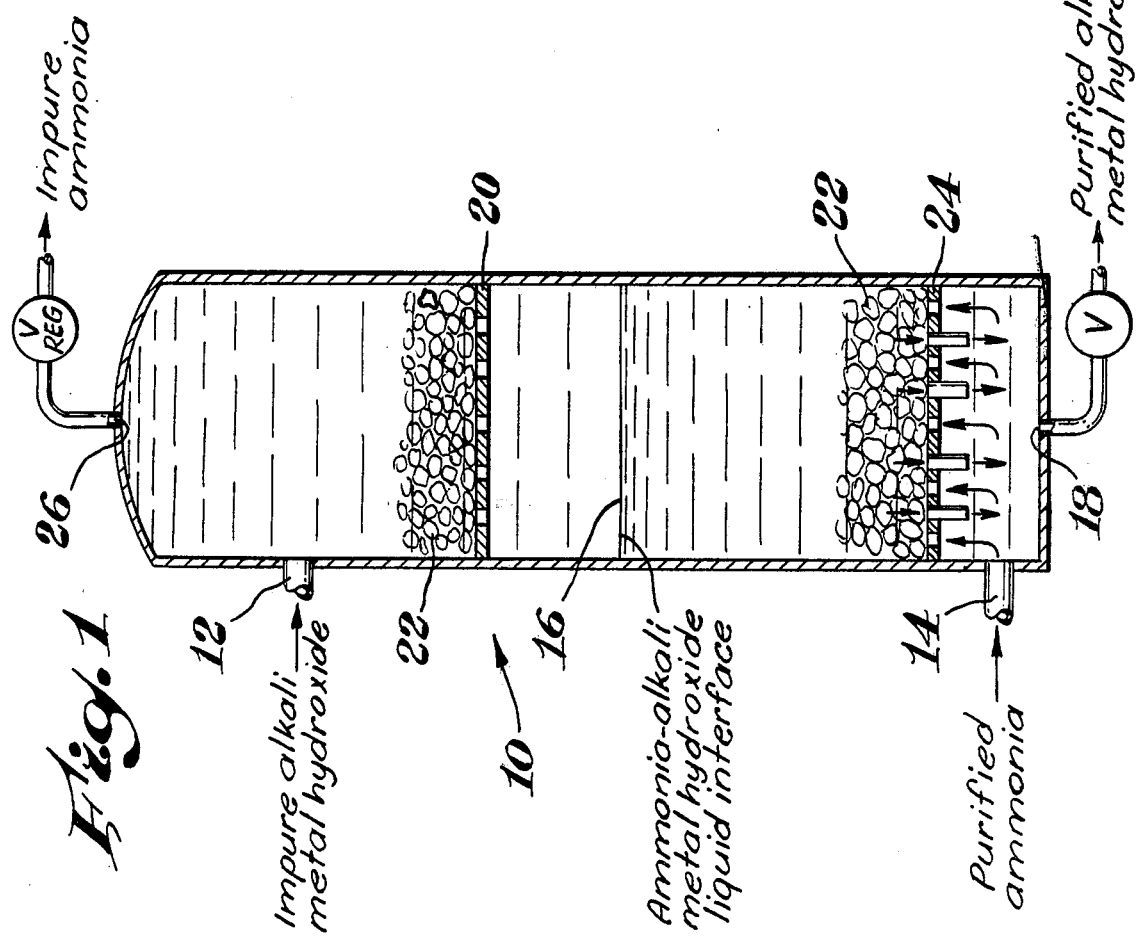

PURIFICATION OF ALKALI METAL HYDROXIDES

BACKGROUND OF THE INVENTION

This invention relates to the purification of alkali metal hydroxides and more in particular to the removal of soluble impurities from alkali metal hydroxides by contacting such hydroxides with ammonia.

Alkali metal hydroxides, such as sodium hydroxide, are generally produced commercially in the so-called mercury cells or diaphragm cells. In sodium hydroxide produced by mercury cells, a sodium chloride impurity may be present in an amount of roughly 0.01 to 0.001 weight percent. A typical diaphragm cell aqueous effluent contains about 8 to 10 weight percent sodium hydroxide and 15 weight percent sodium chloride. The diaphragm cell effluent is concentrated by evaporation to raise the sodium hydroxide concentration to about 50 weight percent and to reduce the sodium chloride concentration. However, even after such reduction of the sodium chloride, the 50 percent aqueous sodium hydroxide solution from the diaphragm cell still contains about 1 to 2 weight percent sodium chloride.

A number of processes have been developed throughout the years to reduce the sodium chloride concentration in aqueous sodium hydroxide. Many patents have issued describing the removal of sodium chloride and sodium chlorate from aqueous solutions containing a 50 percent concentration of caustic soda. U.S. Pat. No. 2,196,594 discloses an apparatus and process to purify a 50 percent or greater concentration of caustic liquor by countercurrently contacting the aqueous caustic liquor with liquid ammonia at a superatmospheric pressure and temperatures of 50° to 100° C. U.S. Pat. Nos. 2,196,595; 2,285,299; 2,285,300; 2,349,596; 2,325,339; 2,354,823 and 2,373,257 disclose still other processes for treating an aqueous sodium hydroxide containing solution with ammonia. The process of U.S. Pat. No. 2,622,009 removes salt impurities from an aqueous caustic soda solution, containing 45 to 50 percent caustic, using liquid ammonia and contact temperatures of 130° to 160° F. at pressures above 300 pounds per square inch (psi). These processes have been successful in eliminating a major portion of the sodium chloride impurity, but the existing ammonia-aqueous sodium hydroxide impurity extracting processes have generally not been able to consistently reduce the sodium chloride impurity in the caustic to a concentration level closely approaching that of mercury cell caustic.

Consequently, it is desired to provide a process which can reduce the impurity (such as sodium chloride) concentration in an aqueous alkali metal hydroxide solution to a level approaching that of mercury cell caustic.

SUMMARY OF THE INVENTION

The hereinafter disclosed invention pertains to an improved method to purify an impure alkali metal hydroxide by countercurrently contacting an aqueous solution of the hydroxide with ammonia. The aqueous hydroxide solution and ammonia are contacted in liquid phases within a container having a first inlet for the impure hydroxide solution upwardly disposed from a second inlet for the ammonia. The container further has a first outlet for the purified hydroxide solution and a second outlet for the ammonia containing impurities extracted from the impure hydroxide solution. The improvement of the present invention comprises feeding an aqueous solution containing from about 40 to about 60 weight percent of the alkali metal hydroxide, and at least a sodium chloride impurity, into the first inlet. Sufficient ammonia is fed into the second inlet to provide an ammonia to alkali metal hydroxide volume ra ratio of about 0.6 to 1 to about 1 to 1. The hydroxide and ammonia are caused to countercurrently flow through a bed of a substantially inert, insoluble particulate material in the container. The temperature of the purified hydroxide solution in the lower portion of the container is controlled within a range of at least about 155° to about 170° F.

BRIEF DESCRIPTION OF THE DRAWING

The two figures of the drawing schematically depict different embodiments of an apparatus in which the improved method of the present invention can be carried out. Identical numerals, distinguished by a letter suffix, within the figures represent parts having a similar function within the different embodiments.

DESCRIPTION OF THE PREFERRED EMBODIMENTS

In practice of one embodiment of the present invention, an aqueous solution containing an alkali metal hydroxide such as potassium hydroxide or more preferably sodium hydroxide with impurities dissolved therein, is fed into a generally cylindrical container 10 through a first inlet port 12 in the container 10. Liquid ammonia ($NH_3$) with a preferred purity of at least about 90 (and more preferably at least about 95) weight percent and containing less than about 30 (and more preferably less than about 10) parts per million (ppm) sodium chloride, is fed into port 14 of the container 10 whereafter it flows upwardly through such container countercurrently to the flow of the alkali metal hydroxide solution passing downwardly through the container.

In operation, the pressure within the container 10 is maintained at a sufficient level to insure that the ammonia and hydroxide solution are liquid during the extraction or purification process. When this is done, and the ammonia to alkali metal hydroxide volume ratio is about 0.6 to 1 to about 1 to 1 and more preferably about 0.7 to 1 to about 0.8 to 1, an ammonia-alkali metal hydroxide interface 16 appears in the cylinder 10 at a position located between the first and second inlets 12 and 14, respectively.

A purified alkali metal hydroxide solution containing significantly less sodium chloride and sodium chlorate impurities than were present in the impure hydroxide solution is removed from the cylinder 10 through a first outlet 18 in a lower portion of the cylinder 10. The temperature of the purified hydroxide solution in the lower portion 11 of the cylinder 10 is preferably controlled to a temperature within a range of at least about 155° to about 170° F. More preferably, this temperature is controlled and maintained within a range of about 160° to about 165° F. and most preferably at 162° F. The temperature of the purified hydroxide solution as it is removed from the cylinder 10 through the first outlet 18 is at a temperature which is substantially the same as that in the lower portion of the cylinder 10.

It has been surprisingly found that processing the hydroxide solution within the above-described temperature range combined with use of a bed of a substantially inert, insoluble particulate material in the container through which the hydroxide solution and ammonia flows results in the production of a purified alkali metal hydroxide solution, e.g. sodium hydroxide, with a reduced sodium chlorate concentration and a sodium chloride impurity level approaching that achievable in the socalled mercury cell caustic.

The particulate material is essentially insoluble and nonreactive with either the ammonia or the hydroxide solution at the temperatures and pressures utilized during the process. For example, polypropylene, polytetrafluoroethylene, polypropylene, nickel, Inconel, and the like, are satisfactory for use in the present sodium hydroxide purification process. Other suitable materials will be readily apparent to those skilled in the art. The size and configuration of the particulate material useful in the present invention will vary depending upon the size of the container in which the impurity extraction process is operated. The particulate material should provide a packed bed of sufficient porosity to permit adequate flow of the hyroxide solution and the ammonia therethrough without an undesired reduction in flow through the cylinder. Simultaneously, the particulate material should be sufficiently small to form a packed bed sufficiently dense to cause the hydroxide solution to flow in an agitated or somewhat turbulent manner through the cylinder toward the first outlet 18. It has been determined that polypropylene "Flexirings" with average diameters of ⅝ inch are satisfactory materials for the bed when sodium hydroxide is treated in a column with a diameter of about 3.5 feet.

An upper support plate 20 is suitably disposed across substantially the entire transverse cross section of the container 10 below the first inlet 12. The first support plate 20 has a plurality of holes therein of a size sufficient to permit the desired flow of the hydroxide solution and ammonia therethrough and insufficient to permit passage of the particulate material 22. In like manner, a lower support plate 24 is disposed between the upper support plate 20 and the second inlet 14. The particulate material 22 in the bed supported by the second support plate 24 can be the same or a different material and/or size and configuration than the material retained by the first support plate 20.

Alternatively, the entirety or any portion of the cylinder between the first inlet 12 and the second inlet 14 can be packed with the particulate material 22 to form a bed of any desired depth.

Treatment of the impure ammonia withdrawn from a second outlet 26 to repurify the ammonia so it may again be used in the disclosed process is performed using technology readily available and known in the art. Likewise, further treatment of the purified hydroxide solution to, for example, form a more concentrated form of sodium hydroxide is carried out using techniques and equipment common in the industry.

The following examples are further illustrative of the invention.

EXAMPLES 1-8

A 40 feet high, generally centrally positioned section of an 8 inch diameter by 60 feet high column extractor was packed between an upper retainer plate 27 and a lower support plate 24a (a distance of 40 feet) with one inch polypropylene "pall rings" substantially the same as shown in FIG. 2 (Example 4 was packed with "Flexipack" type I rings). Referring to FIG. 2, operation of the extractor 10a was begun by setting a pressure valve 28 to release when the pressure within the extractor 10a exceeded 375 pounds per square inch. Sufficient amounts of water and purified liquid ammonia were fed into the extractor 10a through first and second inlets 12a and 14a, respectively, to provide a liquid concentration within the reactor of about 75 weight percent ammonia and about 25 weight percent water. When this composition has been obtained and the entire extractor was filled with liquid, the feed was stopped and the contents of the extractor heated to 158° F.

When the temperature had reached 158° F. within the extractor, the flow of an about 50 weight percent solution of sodium hydroxide and water was started through the first inlet 12a and a liquid ammonia simultaneously passed into the lower portion of the extractor through the second inlet 14a. The volume ratio of liquid ammonia to caustic solution flowing into the extractor was initially controlled at 0.75. Valve 30 remained closed until the ammonia-caustic solution interface level reached about the middle of the extractor, i.e. about one-half the height of the extractor; until this interface level was reached, effluent was removed from the extractor through a second outlet 26a. The valve 30 was opened after reaching this interface level and a purified 50 percent sodium hydroxide-water solution was continuously removed from the extractor through the first outlet 18a.

The Table lists operating parameters for Examples 1-8. It will be observed from the Table that the described process can reduce the sodium chloride concentration in the sodium hydroxide solution removed from the extractor to extremely low levels.

EXAMPLES 9 AND 10

Using an extractor with a diameter of 42 inches and a height of 60 feet with a 40 foot portion thereof packed with 1 inch (Example 9) of ⅝ inch (Example 10) polypropylene "Flexirings," a 50 percent sodium hydroxide solution was pumped as described above for Examples 1-8.

TABLE

| | Feed Flow Rate (gal/min) | | NH$_3$:NaOH Volume Ratio | Extractor Temperature (°F.) | | NaCl Concentration (Weight %) | | |
|---|---|---|---|---|---|---|---|---|
| Example | Ammonia | NaOH | | Bottom | Top | NH$_3$ Feed | NaOH Feed | NaOH Product |
| 1 | 1.18 | 1.68 | 0.70:1 | 158 | 149 | 0.002 | 1.00 | 0.007 |
| 2 | 0.93 | 1.38 | 0.67:1 | 158 | 150 | 0.061 | 0.97 | 0.012 |
| 3 | 1.56 | 2.10 | 0.74:1 | 158 | 163 | 0.0022 | 0.0144* | 0.0002 |
| 4 | 1.12 | 1.49 | 0.75:1 | 159 | 162 | 0.001 | 1.05 | 0.006 |
| 5 | 1.19 | 1.76 | 0.68:1 | 163 | 161 | 0.002 | 1.13 | 0.005 |
| 6 | 1.19 | 1.76 | 0.68:1 | 163 | 158 | 0.160 | 1.10 | 0.149 |
| 7 | 1.18 | 1.68 | 0.70:1 | 165 | 153 | 0.003 | 0.97 | 0.021 |
| 8 | 1.18 | 1.68 | 0.70:1 | 167 | 153 | 0.002 | 0.97 | 0.057 |
| 9 | 68.0 | 85.0 | 0.80:1 | 162 | 150 | 0.0001 | 0.97 | 0.0060 |

TABLE-continued

| | Feed Flow Rate (gal/min) | | NH₃:NaOH | Extractor Temperature (°F.) | | NaCl Concentration (Weight %) | | |
|---|---|---|---|---|---|---|---|---|
| Example | Ammonia | NaOH | Volume Ratio | Bottom | Top | NH₃ Feed | NaOH Feed | NaOH Product |
| 10 | 68.0 | 85.0 | 0.80:1 | 162 | 150 | 0.0001 | 0.98 | 0.0020 |

*The NaOH solution treated had previously been processed through the extractor one time.

What is claimed is:

1. In a method to purify in liquid phases, an impure alkali metal hydroxide by countercurrently contacting an aqueous solution of the hydroxide with ammonia in a container having a first inlet for the impure hydroxide solution upwardly disposed from a second inlet for the ammonia, a first outlet for the purified hydroxide solution and a second outlet for the ammonia containing impurities extracted from the impure hydroxide solution, the improvement comprising
    (a) feeding an aqueous solution containing from about 40 to about 60 weight percent alkali metal hydroxide and at least a sodium chloride impurity into the first inlet;
    (b) feeding sufficient ammonia into the second inlet to provide an ammonia to alkali metal hydroxide volume ratio of about 0.6 to 1 to about 1 to 1;
    (c) countercurrently flowing the hydroxide and ammonia through a bed of a substantially inert, insoluble particulate material in the container; and
    (d) controlling the temperature of the purified hydroxide solution in the lower portion of the container within a range of about 155° to about 170° F.

2. The improvement of claim 1 wherein the solution contains about 48 to about 52 weight percent of the alkali metal hydroxide.

3. The improvement of claim 1 wherein the ammonia fed into the container is at least about 90 weight percent pure and contains less than about 30 parts per million sodium chloride.

4. The improvement of claim 1 wherein the ammonia fed into the container is at least about 90 weight percent pure and contains less than about 10 parts per million sodium chloride.

5. The improvement of claims 1, 2, 3 or 4 wherein the alkali metal hydroxide is sodium hydroxide.

6. The improvement of claim 1 wherein the alkali metal hydroxide is sodium hydroxide containing less than about 1.2 weight percent sodium chloride and the purified hydroxide solution contains less than about 0.006 weight percent sodium chloride.

7. The improvement of claims 1 or 3 wherein the volume ratio of ammonia to alkali metal hydroxide is about 0.7 to 1 to about 0.8 to 1.

8. The improvement of claims 1, 3 or 4 wherein the temperature is controlled within the range of about 160° to about 165° F.

9. The improvement of claims 1, 3 or 4 wherein the temperature is controlled within the range of about 160° to about 165° F. and the ammonia to alkali metal hydroxide ratio is about 0.7 to 1 to about 0.8 to 1.

10. The improvement of claim 7 wherein the alkali metal hydroxide is sodium hydroxide.

11. The improvement of claim 8 wherein the alkali metal hydroxide is sodium hydroxide.

12. The improvement of claim 1 including before step (a), filling the container with ammonia and water to provide a liquid concentration within the container of about 75 weight percent ammonia and about 25 weight percent water and thereafter heating the contents of the container to operating temperature.

13. The improvement of claims 1, 3, 4 or 12 wherein the temperature is 158° to 167° F.

14. The improvement of claims 1 or 12 wherein the temperature is 162° F.

15. The improvement of claim 12 wherein the alkali metal hydroxide is sodium hydroxide.

16. The improvement of claim 13 wherein the alkali metal hydroxide is sodium hydroxide and the sodium hydroxide solution is agitated as said solution flows through the particulate material.

17. The improvement of claim 14 wherein the alkali metal hydroxide is sodium hydroxide.

* * * * *

UNITED STATES PATENT AND TRADEMARK OFFICE
CERTIFICATE OF CORRECTION

PATENT NO. : 4,372,924

DATED : February 8, 1983

INVENTOR(S) : David L. Porter

It is certified that error appears in the above—identified patent and that said Letters Patent is hereby corrected as shown below:

Col. 2, line 6, delete "ra" at the beginning of the line.

Col. 3, line 5, delete "socalled" and insert --so-called--.

Col. 3, line 19, delete "hyroxide" and insert --hydroxide--.

Col. 3, line 27, insert --and 1 inch-- after "5/8 inch".

Signed and Sealed this

Twenty-fourth Day of May 1983

[SEAL]

Attest:

DONALD J. QUIGG

Attesting Officer     Acting Commissioner of Patents and Trademarks